United States Patent
Mamiya et al.

[11] Patent Number: 5,983,857
[45] Date of Patent: Nov. 16, 1999

[54] ENGINE CONTROL SYSTEM

[75] Inventors: Kiyotaka Mamiya; Michihiro Imada; Masayuki Tetsuno, all of Hiroshima, Japan

[73] Assignee: Mazda Motor Corporation, Hiroshima, Japan

[21] Appl. No.: 09/021,314

[22] Filed: Feb. 10, 1998

[30] Foreign Application Priority Data

Feb. 12, 1997 [JP] Japan ..................................... 9-028188
Feb. 12, 1997 [JP] Japan ..................................... 9-028189

[51] Int. Cl.⁶ ...................................................... F02D 9/06
[52] U.S. Cl. .......................... 123/325; 123/295; 123/326
[58] Field of Search ..................................... 123/295, 430, 123/325, 326

[56] References Cited

U.S. PATENT DOCUMENTS

| | | | |
|---|---|---|---|
| 4,466,526 | 8/1984 | Howlwtt et al. | 123/326 |
| 4,655,179 | 4/1987 | Kashiwagura | 123/326 |
| 4,805,579 | 2/1989 | Toshimitsu et al. | 123/326 |
| 4,840,156 | 6/1989 | Yamato et al. | 123/326 |
| 5,119,781 | 6/1992 | Trombley et al. | 123/325 |
| 5,438,826 | 8/1995 | Blischke et al. | 123/326 |

FOREIGN PATENT DOCUMENTS

7-279729  10/1995  Japan .

*Primary Examiner*—John Kwon
*Attorney, Agent, or Firm*—Sixbey, Friedman, Leedom & Ferguson, PC; Donald R. Studebaker

[57] ABSTRACT

An engine control system for an automobile engine of, for example, the type which injects fuel directly into an combustion chamber (16) and executes a fuel-cut control under a specified engine operating condition establishes a stratified charge combustion mode and a homogeneous charge combustion mode selectively according to engine operating conditions following termination of the fuel-cut control and shuts off nearly completely an engine throttle valve (28) during execution of the fuel-cut control and opens the engine throttle valve (28) so as to variably control an amount of intake air passing through an intake passage (24) into the combustion chamber (16) before the stratified charge combustion mode is established following termination of the fuel-cut control.

17 Claims, 8 Drawing Sheets

ENGINE CONTROL SYSTEM

BACKGROUND OF THE INVENTION

1. Field of the Invention

The invention relates to a control system for an automobile engine, and more particularly, to an engine control system including a combustion control means for selecting combustion modes of an engine between a stratified charge combustion mode and a homogeneous charge combustion mode according to engine operating conditions and a fuel control means for enforcing a fuel cut upon an occurrence of a specified engine operating condition.

2. Description of the Related Art

Typically, in order for a fuel injection control system of the type injecting fuel directly into a combustion chamber of an internal combustion engine, and firing the fuel to reduce impact or shock imposed on the driver, a control means is equipped to prevent a change from an intake stroke injection mode to a compression stroke injection mode and vice versa. As described in, for example, Japanese Unexamined Patent Publication No. 7-279729, such a fuel injection control system switches control from an intake stroke injection mode to a compression stroke injection mode and vice versa according to engine operating conditions, decides fuel cut patterns according to engine operating conditions and practices a fuel cut in the fuel cut pattern, and holds either one of the fuel injection modes in the event where a specified engine operating condition is effected after resumption of fuel injection.

The fuel injection control system described in the above publication has a problem that the engine is apt to cause a miss fire due to a lack of intake air introduced into the combustion chamber if holding the compression stroke injection mode. This is because the fuel injection control system is adapted to hold either one of the fuel injection mode, namely the intake stroke injection mode or the compression stroke injection mode, when the conditions of interruption of the fuel cut is met as a result of a decline in engine speed after the fuel cut control has once begun. Specifically, in order for, in particular, a lean burn engine which burns a lean fuel mixture of air-fuel ratios between 40 and 140 in a stratified charge combustion mode to prevent the catalyst of an exhaust emission purifying device from encountering a decline in temperature due to a low temperature of intake air during the fuel cut control, the fuel injection control system controls an intake air regulator, such as an electrically controlled engine throttle or an idle speed control valve, to remain closed. The engine generally runs with a low engine load when the fuel injection control system resumes fuel injection after a fuel cut. At this time, while it is preferred for the engine to practice stratified charge burning in the compression stroke injection mode, nevertheless, a delay in supplying air is unavoidable even if the fuel injection control system opens the intake air regulator simultaneously with resuming fuel injection, as a result of which, a delay in stratification of a fuel mixture is encountered due to a lack of intake air, then the fuel mixture is partly enriched in excess around the ignition plug and miss fired.

SUMMARY OF THE INVENTION

It is an objective of the invention to provide an engine control system which effectively prevents a miss fire of an engine when resuming fuel injection after a fuel cut control.

The foregoing object of the present invention is achieved by providing an engine control system for an automobile engine of the type executing a fuel-cut control under a specified engine operating condition and establishing a stratified charge combustion mode and a homogeneous charge combustion mode selectively according to engine operating conditions at termination of the fuel-cut control.

According to one embodiment of the invention, the engine control system predicts whether the fuel-cut control is shortly before termination, and actuates an intake air regulation means, such as engine throttle, which is disposed in an intake passage of the intake system to regulate the cross-sectional area of the intake passage, to shut off nearly completely the intake passage during execution of the fuel-cut control and to open the intake passage so as to variably control the amount of intake air passing through the intake passage into the combustion chamber of the engine when predicting that the fuel-cut control is shortly before termination.

With the engine control system, while, when the fuel-cut control is predicted to be shortly before termination, i.e. before a point of time in which a time necessary to introduce an increased amount of intake air into the combustion chamber is taken into account, the intake air regulator means is actuated to open the intake passage, fuel injection is thereafter resumed to execute stratified charge combustion when the engine operating condition specified to termination of the fuel-cut control is developed.

Termination of the fuel-cut control may be decided by comparing the engine speed of rotation with a first critical speed specified, which is slightly higher than a second critical speed at which the fuel-cut control is terminated and detecting that the engine speed is lower than the first critical speed. The intake air regulation means is actuated when the engine speed of rotation falls to or below the first critical speed, and the fuel-cut control is terminated when the engine speed of rotation further falls to or below the second critical speed. The first critical speed may be varied according to rates of change in the engine speed of rotation.

According to another embodiment of the invention, the engine control system actuates the intake air regulator to shut off nearly completely the intake passage during execution of the fuel-cut control and to open the intake passage so as to variably control the amount of intake air to be introduced into the engine at termination of the fuel-cut control and establishes and holds the homogeneous charge combustion mode for a predetermined period of time following the termination of the fuel-cut control.

With the engine control system, while either one of stratified charge combustion and homogeneous charge combustion is executed according to engine operating conditions when the engine runs with ordinary operating conditions, the fuel-cut control is executed accompanying completely or almost completely closing the intake air regulation means when the specified engine operating condition is satisfied. When the engine operation gains a critical condition specified to termination of the fuel-cut control as a result of execution of the fuel-cut control, fuel injection is resumed together with actuating the intake air regulation means to open the intake passage and the homogeneous charge combustion mode is established and held for the specified period of time in which a time necessary to introduce an increased amount of intake air into the combustion chamber is taken into account.

In any one of the embodiments, the engine control system may be equipped with swirl generating means to generate a swirl of air when the stratified charge combustion mode is established. Generation of a swirl of air yields optimized stratified charge combustion. Fuel may be injected directly into the combustion chamber on a compression stroke to establish the stratified charge combustion mode. The fuel direct injection on a compression stroke creates distribution of a lean fuel mixture in the entire combustion chamber and, however, local concentration of an enriched fuel mixture around the ignition plug, which is always desirable for stratified charge combustion to be certainly caused after termination of the fuel-cut control and optimized.

In the case where the engine is of the fuel direct injection type, the intake air regulator means is installed to an upstream part of the intake passage. This intake air regulator means is actuated at least at termination of the fuel-cut control when fuel injection is resumed, so that an proper amount of intake air is certainly introduced into the combustion chamber to ensure the stratified charge combustion.

BRIEF DESCRIPTION OF THE DRAWINGS

The foregoing and other objects and features of the present invention will be clearly understood from the following detailed description of preferred embodiments when read in conjunction with the accompanying drawings in which same parts or elements have been denoted by the same reference numbers throughout the drawings and wherein.

DETAILED DESCRIPTION OF THE PREFERRED EMBODIMENT

Figure 1:
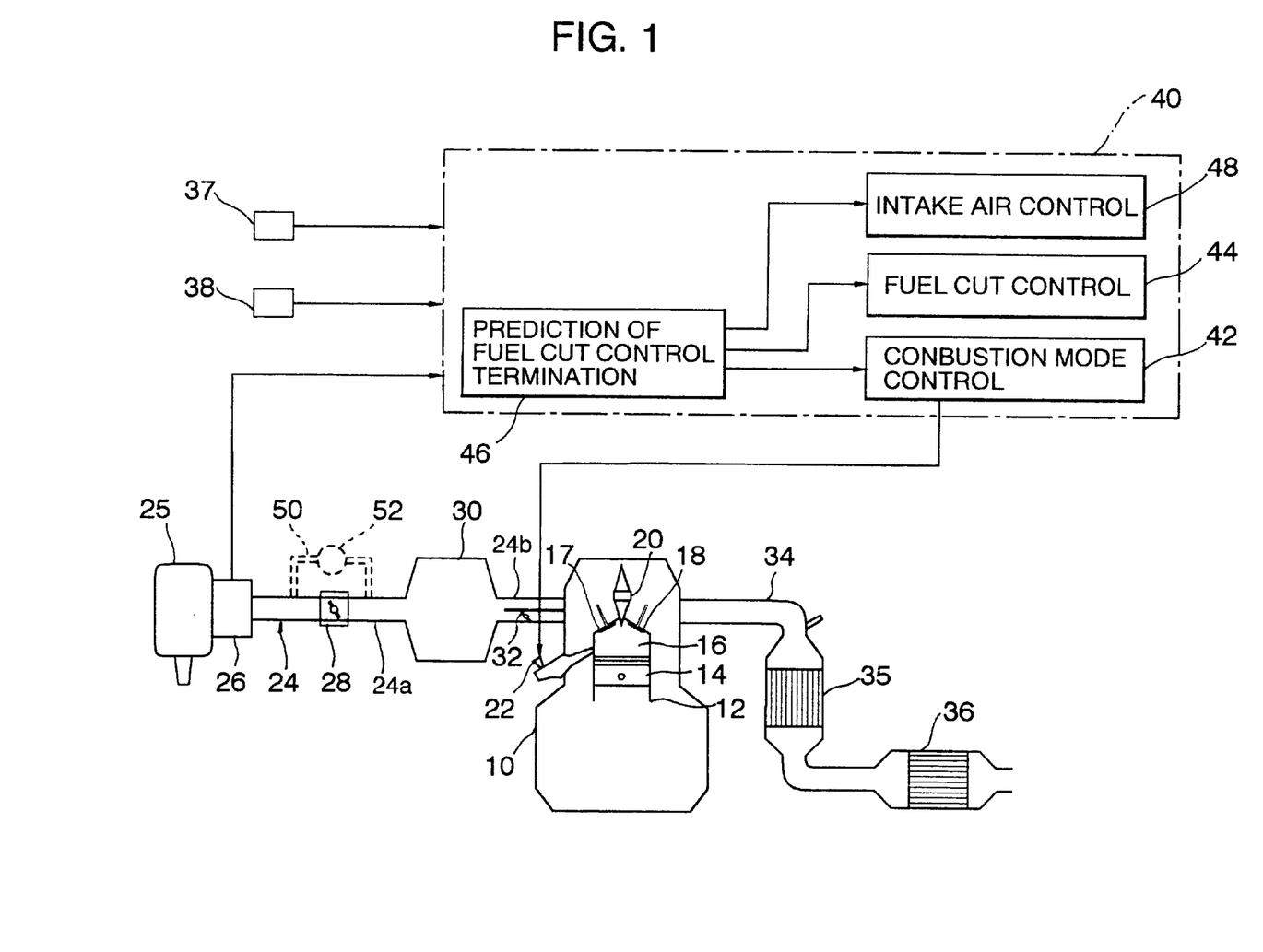
FIG. 1 is a schematic illustration showing a fuel direct injection type of internal combustion engine equipped with an engine control system in accordance with an embodiment of the invention.

Referring to the drawings in detail and, in particular, to FIG. 1 showing an internal combustion engine 10 equipped with an engine control system in accordance with an embodiment of the invention, the engine 10 has at least one cylinder 12 in which a piston 14 is received and slides. A combustion chamber 16 is formed above a top of the piston 14 in the cylinder 12. The cylinder 12 is provided with two intake ports and two exhaust ports, all of which open into the combustion chamber 16 and are opened and shut at predetermined timings by intake valves 17 and exhaust valves 18, respectively. The engine 10 is equipped with an ignition or spark plug 20 with the electrode tip placed down into the combustion chamber 16. A direct injection valve 22 is installed to a side wall of the engine to inject fuel directly into the combustion chamber 16. Various types of fuel injectors are known in the art, and the fuel injector 22 may take any well known type including the type of directing fuel onto the top of the piston 14 so that the fuel rebounds toward the ignition plug 20 may be employed. The fuel injector 22, which incorporates a needle valve and solenoid (both of which are not shown), keeps the needle valve open depending upon a pulse width of a fuel injection pulse adjusted and supplied to the solenoid so as to deliver a correct air-fuel ratio for any given engine demand.

Intake air is introduced into the cylinder 12 through an intake passage 24 comprising a common intake pipe 24a as an upstream part and two separate intake pipes 24b as a downstream part branching off from the downstream end of the common intake pipe 24a to the intake ports, respectively. The common intake pipe 24a is equipped in order from the upstream end with an air cleaner 25, an air flow sensor 26, an electrically controlled engine throttle 28 and a surge tank 30. One of the separate intake pipe 24b is equipped with a swirl control valve 32 by which the intake port is opened and shut. As will be described in detail later, during the engine control, the swirl control valve 32 is fully or almost fully closed to create a swirl of air in the combustion chamber 16 in the stratified charge combustion mode. Exhaust gas is discharged through an exhaust passage 34 equipped with emission control devices such as a three-way catalytic converter 35 and a catalytic converter 36 for converting emissions including oxides of nitrogen (NOx) generated from combustion of, in particular, a lean fuel mixture. These catalytic converters 35 and 36 are placed near an exhaust manifold which is exposed to exhaust gas usually at relatively high temperatures.

Figure 2:
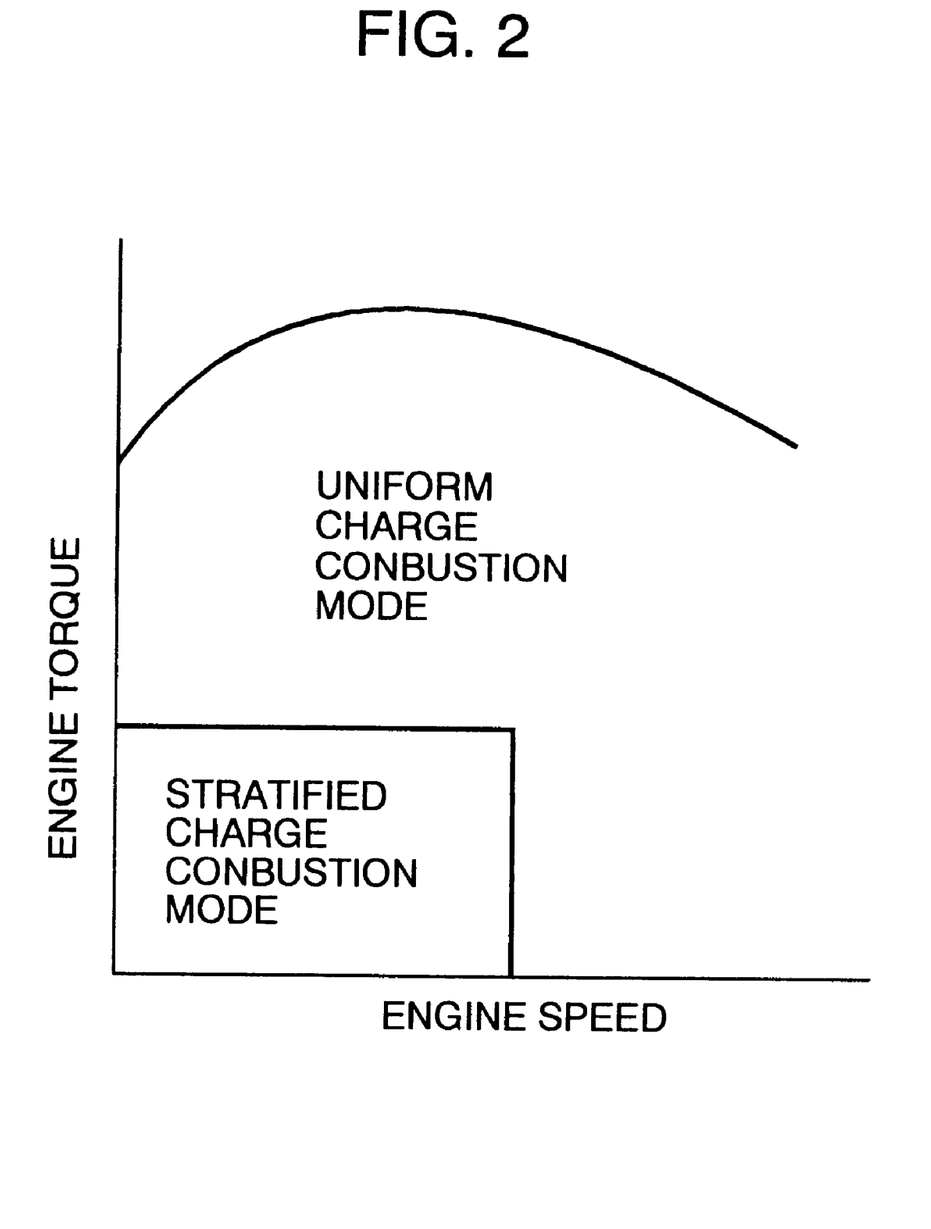
FIG. 2 is a map of combustion modes with respect to engine operating conditions.

The engine 10 is further equipped with various sensors including an engine speed sensor 37 and throttle sensor 38 for generating and sending engine speed signal and throttle position signal to an engine control unit 40 as schematically shown in block in FIG. 1. The engine control unit 40 comprises a microcomputer having functional blocks, namely combustion control means 42 for changing combustion between the stratified charge combustion mode and the homogeneous charge combustion mode according to engine operating conditions, fuel-cut control means 44 for cutting fuel in the event where the engine operates under specified conditions, fuel-cut termination prediction means 46 for predicting that the fuel-cut control is almost terminated, and intake air control means 48 for controlling the intake air regulator which comprises an electrically controlled engine throttle 28 to control the amount of intake air to be introduced into the engine 10. The combustion control means 42 performs latter injection which refers to fuel injection made at a time in the latter half of a compression stroke or early injection which refers to fuel injection made at a time in a period including a full intake stroke and the early half of a compression stroke according to incoming signals from the engine speed sensor 37 and the throttle position sensor 38. In more detail, as shown in FIG. 2, when the engine runs at speeds lower than a stipulated speed level and provides output torque lower than a stipulated torque level, in other words when the engine runs in a range of lower engine loads where fuel consumption is relatively small, the combustion control means 42 performs the latter injection to establish the stratified charge combustion mode in which a fuel mixture is locally enriched around the ignition plug 20 while being lean in substantially the whole interior of the combustion chamber 16. On the other hand, when the engine runs at speeds higher than the stipulated speed level and provides output torque higher than the stipulated torque level, i.e. in a range of higher engine loads where fuel consumption is relatively large, the combustion control means 42 performs the early injection to establish the homogeneous charge combustion mode in which a fuel mixture is uniformly sprayed in the combustion chamber 16.

Fuel may be delivered in two steps by the early injection and the latter injection in an intermediate load range between the lower range and the higher range. Specifically, in the intermediate load range, fuel is uniformly sprayed in the combustion chamber 16 by means of the early injection on an intake stroke, and the remaining part of fuel is stratified by means of the latter injection on a compression stroke.

Figure 3:
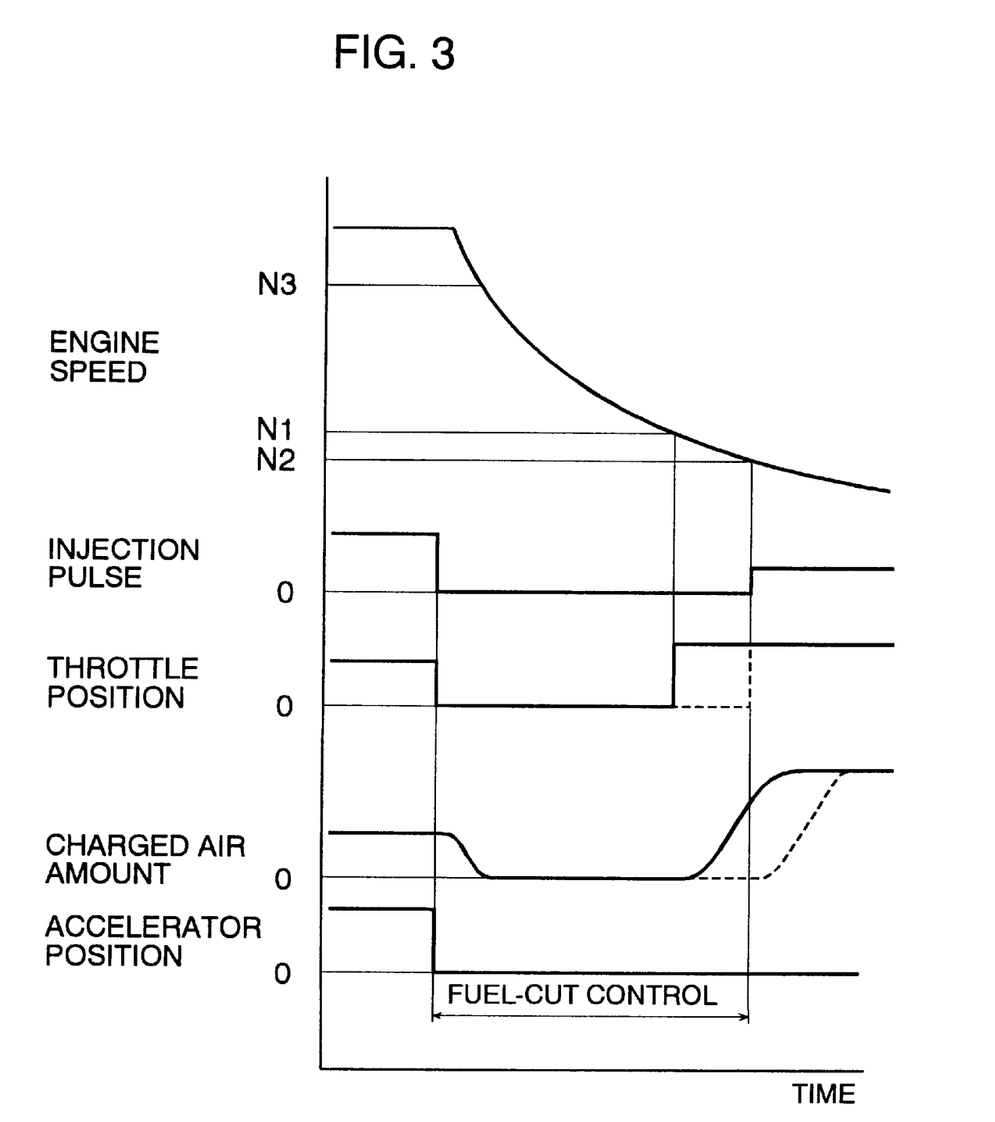
FIG. 3 is a time chart of fuel combustion control of the engine control system shown in FIG. 1.
Figure 4:
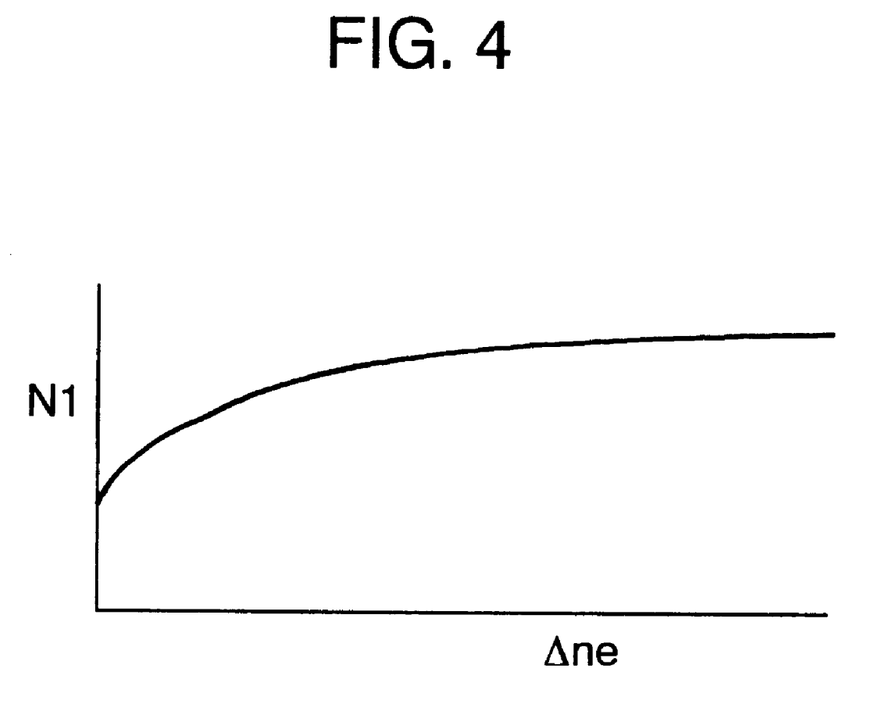
FIG. 4 is a map of fuel-cut termination prediction speed with respect to engine speed changing rate.

The fuel-cut control means 44 performs a fuel-cut by interrupting fuel injection from the fuel injector 22 when the engine control unit 40 receives a position signal from the throttle position sensor 38 indicating a closed position of the engine throttle 28 and a speed signal from the engine speed sensor 37 indicating engine speeds higher than a stipulated critical speed (N3) for the execution of fuel-cut which is hereafter referred to as a fuel-cut speed. As a result of the fuel-cut control, when the fuel-cut termination prediction means 46 detects a decline in engine speed to or lower than a second critical speed (N2) specified to be lower than the fuel-cut speed (N3) during the fuel-cut control, the fuel-cut control means 44 terminates the fuel-cut. When the fuel-cut termination prediction means 46 detects a decline in engine speed to or lower than a first critical speed or fuel-cut termination prediction speed (N1) which is specified to be sufficiently lower than the fuel-cut speed (N3) but slightly higher than the second critical speed (N2) or fuel-cut termination speed as shown in FIG. 3, it decides that the fuel-cut control is shortly before termination thereof and provides a decision signal to the intake air control means 48. Further, the fuel-cut termination prediction means 46 detects a change rate of engine speed $\Delta n_e$ based on a speed signal from the engine speed sensor 37 and varies the fuel-cut termination prediction speed (N1) according to change rates. Specifically, as shown in FIG. 4, the fuel-cut termination prediction speed (N1) is increased with an increase in engine speed change rate $\Delta n_e$.

The intake air control means 48 brings the intake air regulator, i.e. the electrically controlled engine throttle 28 in the embodiment, into a substantially shut off position which includes not only a completely closed position but an nearly completely closed position during a fuel-cut, and opens it to control the cross-sectional area of the intake passage 24 so as to vary the amount of air to be delivered into the combustion chamber 16 of the engine 10 when the fuel-cut termination prediction means 46 detects that the fuel-cut control is almost terminated. As described above, the electrically controlled engine throttle 28 is opened to resume delivery of air into the combustion chamber 16 immediately before the condition of termination of the fuel-cut condition is satisfied, i.e. before the engine speed falls below the fuel-cut termination speed N2, and the stratified charge combustion mode is established simultaneously with termination of the fuel-cut control.

Figure 5:
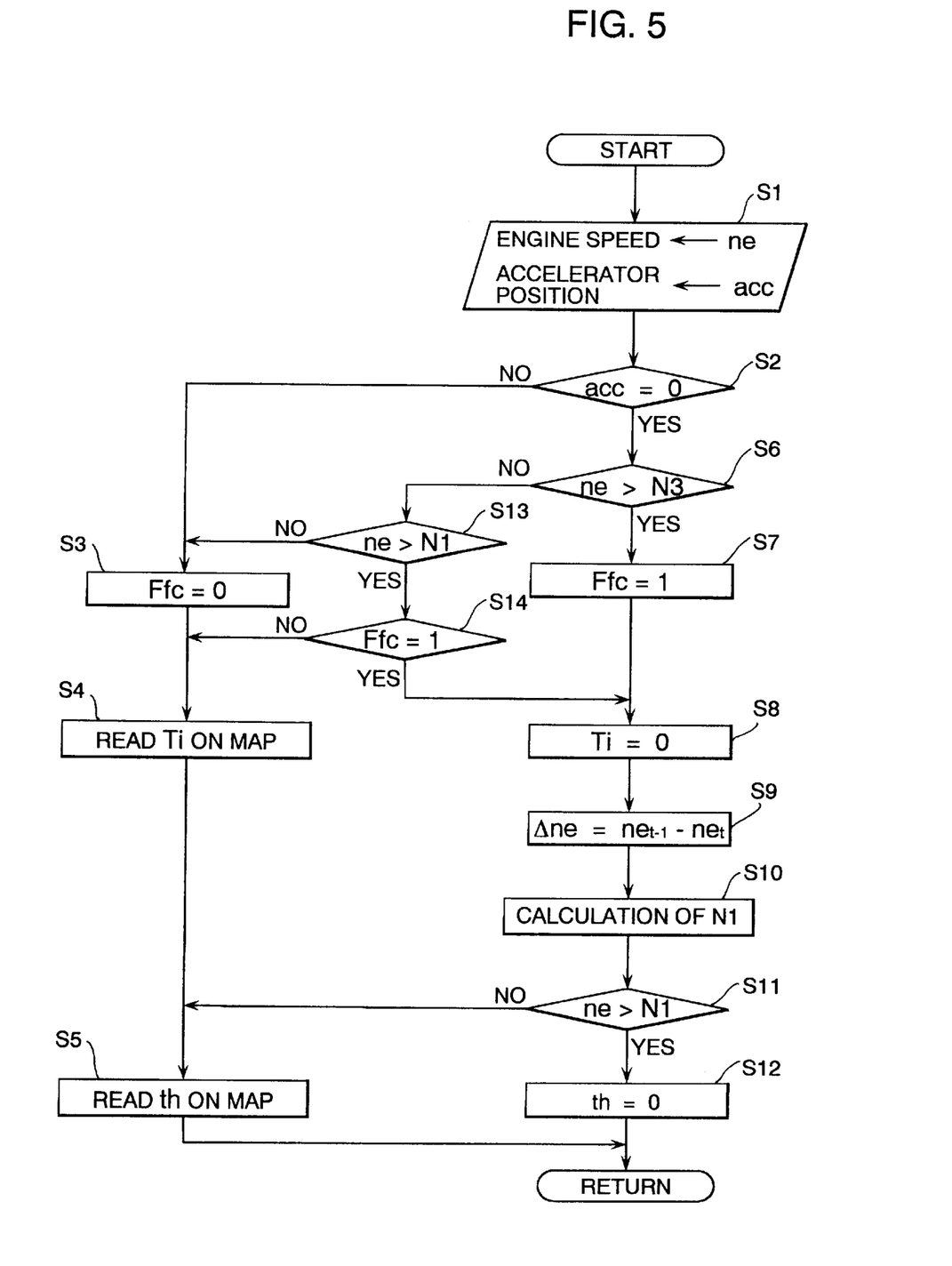
FIG. 5 is a flow chart illustrating the engine control sequence routine for the controller of the engine control system shown in FIG. 1.

The engine control system shown in FIG. 1 performs control following the sequence routine for the control unit 40 illustrated by a flow chart in FIG. 5.

When the flow chart logic commences and control passes directly to a function block at step S1 where an engine operating condition including an engine speed ne and an accelerator position acc is detected. A decision is subsequently made at step S2 as to whether the accelerator is released (the accelerator position acc is zero) to keep the electrically controlled engine throttle 28 remain closed. When the answer to the decision is "NO," this indicates that the accelerator is stepped down, a fuel-cut flag $F_{fc}$ is reset to a state of "0" at step S3. The fuel-cut flag $F_{fc}$ indicates that the fuel-cut control is executed when it is up or set to a state of "1" or that no fuel-cut control is needed when it is down or reset to a state of "0." After reading a fuel injection pulse width Ti on a pulse width map at step S4 and an opening th of the electrically controlled engine throttle 28 on a throttle opening map at step S5, ordinary combustion control is performed either in the homogeneous charge combustion mode or in the stratified charge combustion mode according to the present engine operating condition.

On the other hand, when the accelerator remains released, a decision is made at step S6 as to whether the engine speed ne is higher than the fuel-cut speed N3. When the answer to the decision is "YES," this indicates that the engine speed ne at which the engine 10 runs is higher than the fuel-cut speed N3, then, after setting the fuel-cut flag $F_{fc}$ to the state of "1" at step S7, the fuel-cut control is executed by varying a fuel injection pulse width Ti to zero at step S8. Subsequently, after calculating a change rate of the engine speed $\Delta$ne at step S9, a fuel-cut termination prediction speed N1 for the engine speed change rate $\Delta$ne is read on a prediction speed map at step S10. The engine speed ne is compared to the fuel-cut termination prediction speed N1 at step S11. When the engine speed ne is lower than the fuel-cut termination prediction speed N1, this indicates that the engine speed ne has fallen sufficiently but a little too high to terminate the fuel-cut control, i.e. that the fuel-cut control is shortly before termination, then, a throttle opening th to be gained by the electrically controlled engine throttle 28 is read on the throttle opening map at step S5. On the other hand, when the engine speed ne is higher than the fuel-cut termination prediction speed N1, this indicates that the engine speed ne is still too high to terminate the fuel-cut control, then, the electrically controlled engine throttle 28 is closed by setting the throttle opening th to zero to shut off the intake passage 24 at step S12.

When the answer to the decision concerning the fuel-cut speed N3 made at step S6 is "NO," this indicates that the engine speed ne at which the engine 10 runs is lower than the fuel-cut speed N3, then, the engine speed ne is compared to the fuel-cut termination speed N2 at step S13. When the engine speed ne is lower than the fuel-cut termination speed N2, this indicates that the engine speed ne has fallen sufficiently low to terminate the fuel-cut control, then, after resetting the fuel-cut flag $F_{fc}$ at step S3, a fuel injection pulse width Ti and a throttle opening th to be gained by the electrically controlled engine throttle 28 are read on the pulse width map and the throttle opening map, respectively, at step S4 and step S5 for the ordinary combustion control. On the other hand, when the engine speed ne is higher than the fuel-cut termination speed N2, a decision is made at step S14 as to whether the fuel-cut flag $F_{fc}$ has been up. When the fuel-cut flag $F_{fc}$ has not been up, a fuel injection pulse width Ti and a throttle opening th to be gained by the electrically controlled engine throttle 28 are read on the pulse width map and the throttle opening map, respectively, at step S4 and step S5 for the ordinary combustion control. When the fuel-cut flag $F_{fc}$ has been up, the fuel-cut control is continued through steps S8 to S12.

Figure 6:
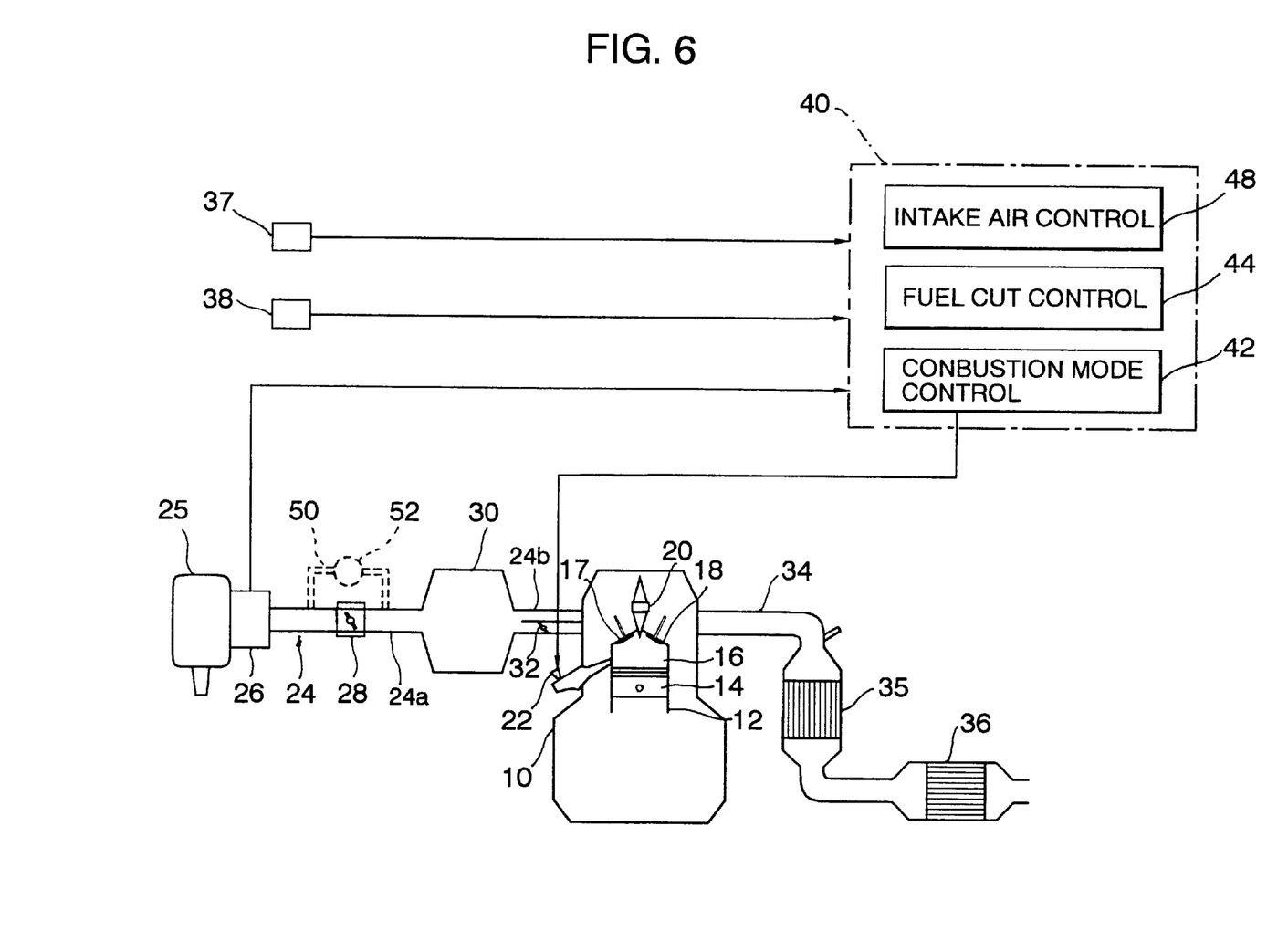
FIG. 6 is a schematic illustration showing a fuel direct injection type of internal combustion engine equipped with an engine control system in accordance with another embodiment of the invention.
Figure 7:
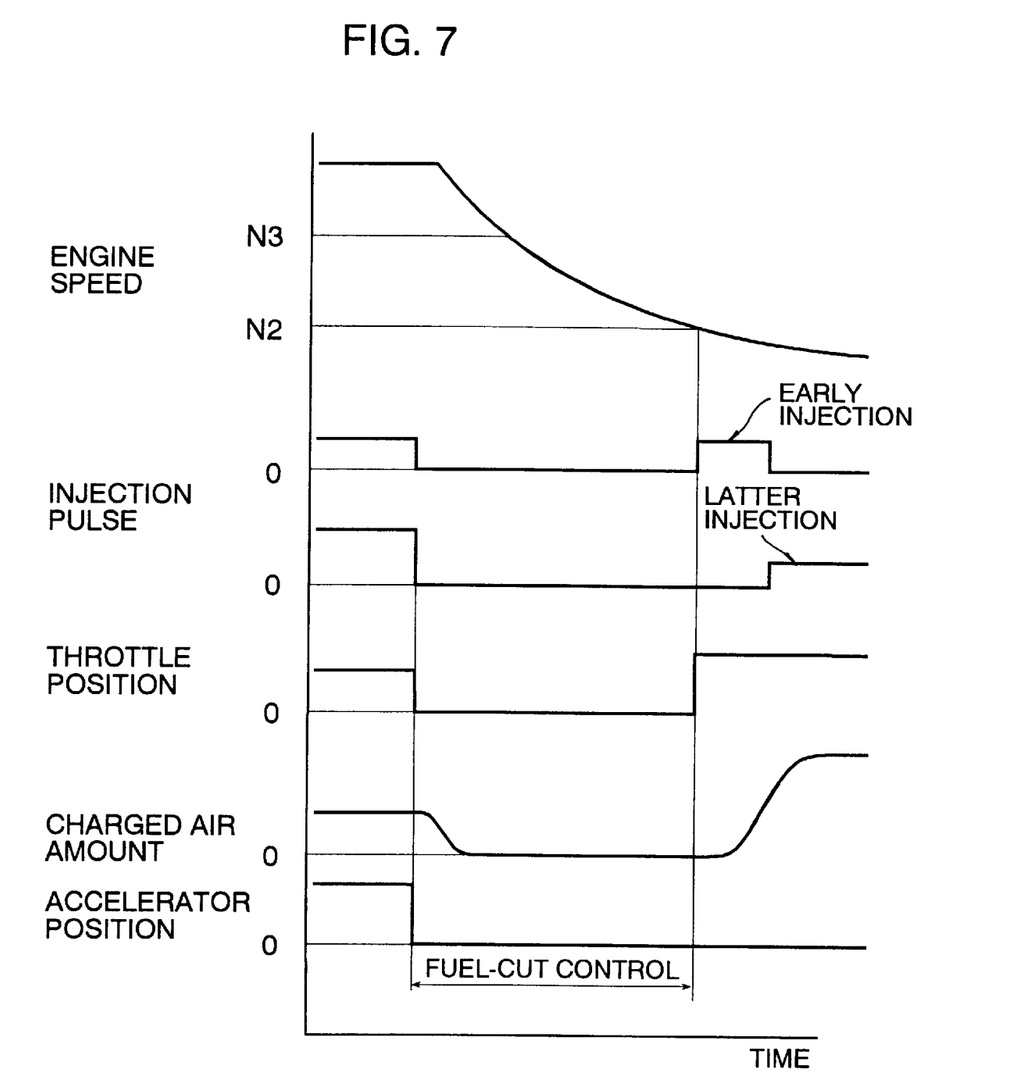
FIG. 7 is a time chart of fuel combustion control of the engine control system shown in FIG. 6.

FIG. 6 shows an engine control system in accordance with another embodiment of the invention which is similar in structure to that of the previous embodiment, excepting that no fuel-cut termination prediction means is performed, i.e. the engine control unit 40 has no function of predicting termination of the fuel-cut control. The elements relating to the engine control system shown in FIG. 6 are timed in operation as shown in FIG. 7.

Figure 8:
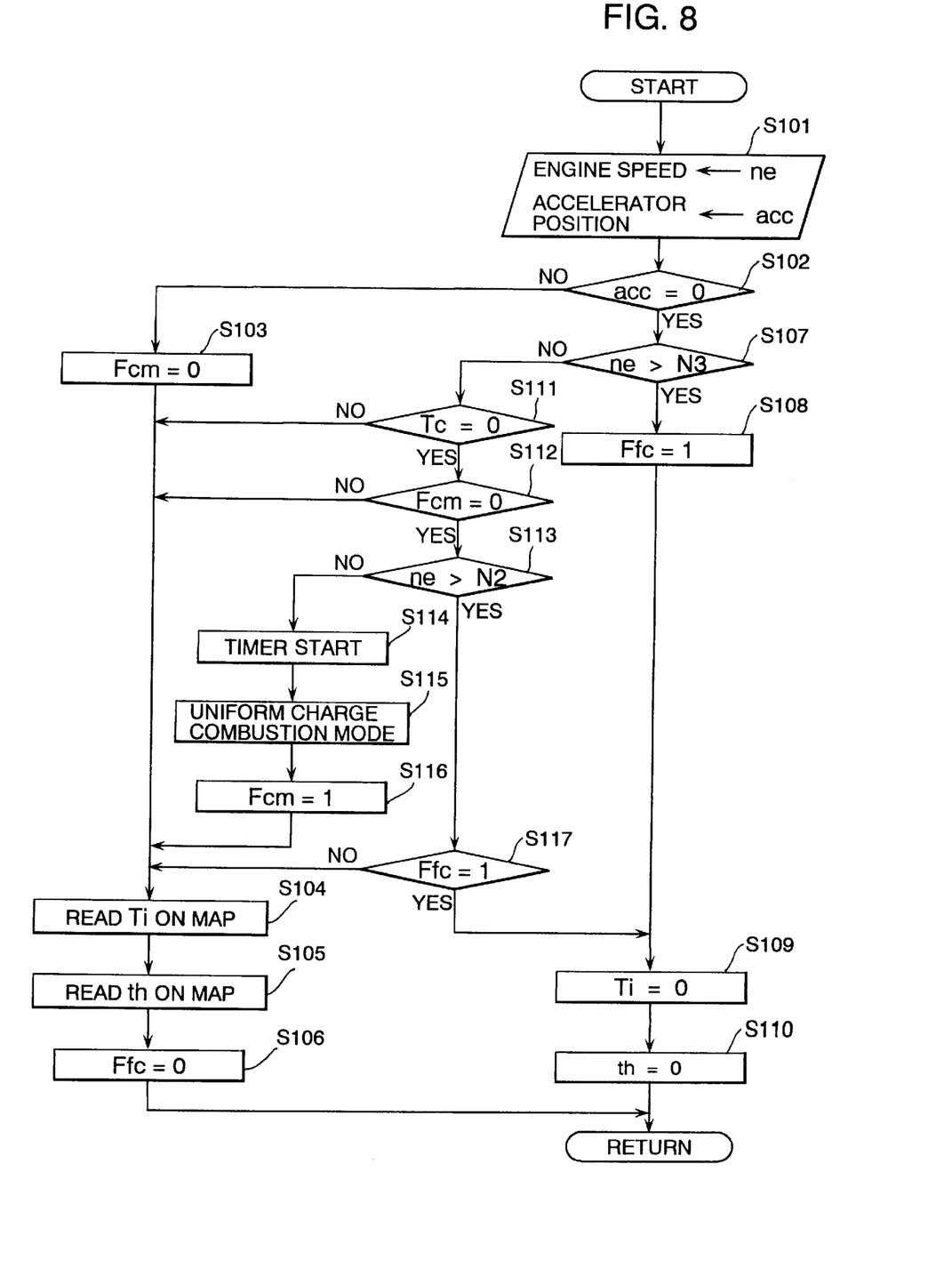
FIG. 8 is a flow chart illustrating the engine control sequence routine for the controller of the engine control system shown in FIG. 6.

The engine control system shown in FIG. 6 performs control following the sequence routine for the engine control unit 40 illustrated by a flow chart shown in FIG. 8.

As shown, after detecting an engine operating condition including an engine speed ne and an accelerator position acc based on signals from the engine speed sensor 37 and the throttle position sensor 38 are detected at step S101, a decision is subsequently made at step S102 as to whether the accelerator is released, i.e. whether the accelerator position acc is zero, to keep the electrically controlled engine throttle 28 remain closed. When the answer to the decision is "NO," this indicates that the accelerator is stepped down, then, a combustion mode flag $F_{cm}$ is reset to a state of "0" at step S103. The combustion mode flag $F_{cm}$ indicates that the homogeneous charge combustion mode is effected when it is up or set to a state of "1" or that the homogeneous charge combustion mode is interrupted when it is down or reset to the state of "0." At steps S104 and S105, a fuel injection pulse width Ti and an opening th of the electrically controlled engine throttle 28 are read on a given pulse width map and a given throttle opening map, respectively. Subsequently, the fuel-cut flag $F_{fc}$ is reset to the state of "0" at step S106, which is accompanied by establishment of either one of the homogeneous charge combustion mode and the stratified charge combustion mode according to the present engine operating condition which is represented by the injection pulse width Ti and the opening th of the electrically controlled engine throttle 28 to perform the ordinary combustion control.

On the other hand, when the accelerator remains released, a decision is made at step S107 as to whether the engine speed ne is higher than a fuel-cut speed N3. When the answer to the decision is "YES," then, after setting the fuel-cut flag $F_{fc}$ to the state of "1" at step S108, the fuel-cut control is executed by varying the fuel injection pulse width Ti to zero to interrupt fuel injection at step S109 and varying the opening of the electrically controlled engine throttle 28 to zero to close the electrically controlled engine throttle 28 so as to shut off the intake passage 24 at step S110. When the answer to the decision made at step S107 is "NO," this indicates that the engine speed ne is lower than the fuel-cut speed N3, then, a decision is made at step S111 as to whether a timer has counted down a count Tc to zero. This timer is used to keep homogeneous charge combustion remain effective for a specified period of time, which is accompanied by resuming ordinary combustion. When the answer to the decision is "YES," this indicates that the down counter has counted down the specified count or has not yet started on counting, then, another decision is made at step S112 as to whether the combustion mode flag $F_{cm}$ has been reset to the state of "0." When the answer to the decision is "YES," this indicates that the homogeneous charge combustion is not executed, then, the engine speed ne is compared with the fuel-cut termination speed N2 at step S113. In the event where the engine speed ne is lower than the fuel-cut termination speed N2, following causing the timer to start on down-counting the specified count at step S114, the homogeneous charge combustion is executed at step S115, which is accompanied by setting the combustion mode flag $F_{cm}$ to the state of "1" at step S116. The homogeneous charge combustion continues for the specified period of time until the timer count downs the initially given count Tc and the ordinary combustion automatically takes place at the expiration of the specified period of time by taking steps S104 and S105. On the other hand, when the answer to the decision made at step S111 or step S112 is "NO," the ordinary combustion is executed through steps S104 and S105. At this time, the engine ordinarily runs in a range of low loads, the stratified combustion is executed by the latter fuel injection.

When the answer to the decision concerning the fuel-cut termination speed N2 made at step S113 is "YES," this indicates that the engine speed ne is still higher than the fuel-cut termination speed N2, then, another decision is made at step S117 as to whether the fuel-cut flag $F_{fc}$ has been up. When the fuel-cut flag $F_{fc}$ is down, the ordinary combustion automatically takes place at the expiration of the specified period of time by taking steps S104 and S105. However, when the fuel-cut flag $F_{fc}$ is up, the fuel-cut control is continued through steps S109 and S110.

In this embodiment, combustion is executed in the homogeneous charge combustion mode by the early injection continuing for the specified period of time when the fuel-cut control is terminated as a result of a decline in engine speed to or below the fuel-cut termination speed N2.

The engine controlled by the engine control system according to the first embodiment of the invention is prevented from causing a miss fire at termination of the fuel-cut control. Specifically, as shown in FIG. 3, the intake air regulator, i.e. the electrically controlled engine throttle 28 in the above embodiment, is almost fully closed to prevent the exhaust emission purifying converters 35 and 36 from experiencing a decline in temperature due to a low temperature of air into the exhaust passage 34 during execution of the fuel-cut control and is re-opened immediately before termination of the fuel-cut control. Consequently, even in the event where there is a delay in delivery of air into the combustion chamber 16 after the re-opening of the intake air regulator, a sufficient amount of air is delivered into the combustion chamber 16 is sufficient at the termination of the fuel-cut control. This leads to no delay in delivery of air such as shown by a broken line in FIG. 3 which is caused in the prior art fuel combustion control when combustion is undertaken in the stratified charge combustion mode by resuming fuel injection through the latter injection and consequently prevents a fuel mixture from being locally enriched in excess around the ignition plug 20 caused due to a lack of air, so that stratified charge combustion is properly performed.

The utilization of the fuel-cut termination prediction speed N1 slightly higher than the fuel-cut termination speed N2 makes it easy to predict that the fuel-cut control terminates very shortly and to re-open the intake air regulator shortly before the termination of the fuel-cut control. The fuel-cut termination prediction speed N1 is increased with an increase in engine speed change rate Δne. For example, even in an event where the engine 10 encounters a sharp drop at a great engine speed change rate Δne to a speed as low as the fuel-cut control is almost instantaneously terminated, the fuel-cut termination prediction speed N1 is magnified according to the engine speed change rate Δne with the result of re-opening properly and quickly the intake air regulator, ensuring a sufficient amount of air to be delivered into the combustion chamber 16 at termination of the fuel-cut control. On the other hand, in an event where the engine 10 gradually decreases its speed at a speed change rate Δne as small as taking a stipulated long time before termination of the fuel-cut control, the fuel-cut termination prediction speed N1 is varied as closely to the fuel-cut termination speed N2 as possible, so as to prevent the intake air regulator from re-opening too early, thereby preventing a decline in temperature of the exhaust emission purifying converters 35 and 36.

In the engine equipped with the swirl control valve 32 to generate a swirl of air in the combustion chamber 16, the stratified charge combustion is properly performed as a result of closing the swirl generating means such as a valve 32, completely or almost completely, not only when the stratified charge combustion mode is needed according to engine operating conditions but when the stratified charge combustion has to be performed after termination of the fuel-cut control. The swirl generating valve is adapted to remain closed until the throttle valve opens immediately before termination of the fuel-cut control and, for example, even during execution of the fuel-cut control. Instead of providing the swirl generating means, the intake port may open downward into the combustion chamber 16 so as to generate a tumble of air comprising vertical turbulence of air.

In the direct injection type of engine, the stratified charge combustion mode is established by timing the fuel injector 22 to inject a small amount of fuel directly into the combustion chamber 16 on a compression stroke, which causes a localized concentration of fuel around the ignition plug 20 during the stratified charge combustion with an effect of effectively burning the small amount of fuel. Further, although the direct injection type engine is apt to concentrate fuel around the ignition plug 20 in the stratified charge combustion mode after termination of the fuel-cut control, a miss fire due to excessive enrichment of fuel is prevented by means of re-opening the intake air regulator as soon as it is predicted that the fuel-cut control terminates very shortly. The miss fire due to excessive enrichment of fuel is also prevented by means of re-opening the intake air regulator as soon as it is predicted that the fuel-cut control terminates very shortly even in an event where air delivery is delayed through a relatively long intake passage between the intake air regulator and the surge tank. Although in the above embodiment the fuel-cut control is completely terminated as soon as the engine speed ne reaches the fuel-cut termination speed N2 and the ordinary injection is resumed, the amount of fuel may be gradually increased, either in steps or linearly, to resume the ordinary injection. Although in the above embodiment, the description has been directed to the fuel direct injection, internal combustion engine of the type having a fuel injector installed to the combustion chamber, however, the engine control system of the invention may be applied to an engine with a fuel injector installed to an intake port or an engine with fuel injectors installed to both intake port and combustion chamber.

Further, the engine controlled by the engine control system according to the second embodiment of the invention is prevented from causing a miss fire at termination of the fuel-cut control. Specifically, combustion is forced not in the stratified charge combustion mode but in the homogeneous charge combustion mode for the specified period of time following opening the intake air regulator in advance to termination of the fuel-cut control, so that a fuel mixture is prevented from being locally enriched in excess around the ignition plug 20 due to diffusion of fuel with an effect of preventing a miss fire.

Further, in the direct injection type of engine, if fuel injection is resumed in the stratified charge combustion mode following termination of the fuel-cut control, fuel is apt to locally concentrate around the ignition plug 20, which leads to a miss fire due to excessive enrichment of fuel, the engine control system prohibits establishment of the stratified charge combustion mode at termination of the fuel-cut control, preventing a miss fire.

The homogeneous charge combustion mode, although which is established by injecting fuel on an intake stroke in the above embodiment may be established for a specified period of time by injecting fuel on both intake and compression strokes so as to restrict establishment of the stratified charge combustion mode for the specified period of time.

Th the swirl control valve 32 is actuated at the time of establishing the stratified charge combustion mode. When the stratified charge combustion mode is established according to engine operating conditions, during the specified time period for the homogeneous charge combustion mode remaining established following termination of the fuel-cut control or when the stratified charge combustion mode is established following expiration of the specified time period for the homogeneous charge combustion mode remaining established, the swirl control valve is completely or almost completely closed to generate a swirl of air, so as to execute properly the combustion control in the stratified charge combustion mode. Also in this embodiment, the intake port may open downward into the combustion chamber 16 so as to generate a tumble of air comprising vertical turbulence of air instead of providing the swirl generating means.

A miss fire due to excessive enrichment of fuel around the ignition plug is effectively prevented by means of re-opening the intake air regulator at termination of the fuel-cut control and establishing and holding the homogeneous charge combustion mode for the specified time period. In the case in this embodiment where a fuel injector is installed to an intake port or to each of an intake port and a combustion chamber, when the homogeneous charge combustion mode is established according to engine operating conditions or at termination of the fuel-cut control, the fuel injector installed to the intake port is pulsed on an early stage of an intake stroke or a compression stroke to make homogeneous charge combustion.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An engine control system for an automobile engine for executing a fuel-cut control under a specified engine operating condition and establishing a stratified charge combustion mode and a homogeneous charge combustion mode selectively according to engine operating conditions following termination of the fuel-cut control, said engine control system comprising:

intake air regulation means disposed in an intake passage of an intake system of the engine for regulating an amount of intake air passing through the intake passage; and intake air control means for predicting whether the fuel-cut control is within a predetermined time period before termination of the fuel-cut control and actuating said intake air regulation means to shut off nearly completely said intake passage during execution of the fuel-cut control and variably open said intake passage so as to vary an amount of intake air passing into the combustion chamber through said intake passage when it is predicted that the fuel-cut control is within said predetermined time period before termination of the fuel-cut control.

2. The engine control system as defined in claim 1, wherein said intake air control means includes a speed sensor for detecting a rotational speed of the engine and compares the engine speed with a first critical speed specified (N1) to be slightly higher than a second critical speed (N2) at which the fuel-cut control is terminated to predict that the fuel-cut control is shortly before termination when the engine speed is lower than said first critical speed (N1).

3. The engine control system as defined in claim 2, wherein said intake air control means changes said first critical speed (N1) according to rates in change of the engine speed.

4. The engine control system as defined in claim 1, and further comprising swirl generating means for generating a swirl of air when the stratified charge combustion mode is established.

5. The engine control system as defined in claim 2, and further comprising swirl generating means for generating a swirl of air when the stratified charge combustion mode is established.

6. The engine control system as defined in claim 3, and further comprising swirl generating means for generating a swirl of air when the stratified charge combustion mode is established.

7. The engine control system as defined in claim 1, wherein during a compression stroke of the engine, fuel is injected in a latter half stroke of the compressions stroke to establish the stratified charge combustion mode.

8. The engine control system as defined in claim 7, wherein said intake air control means includes a speed sensor for detecting a rotational speed of the engine and compares the engine speed with a first critical speed (N1) specified to be slightly higher than a second critical speed at which the fuel-cut control is terminated to predict that the fuel-cut control is shortly before termination when the engine speed is lower than said first critical speed (N1).

9. The engine control system as defined in claim 8, wherein said intake air control means changes said first critical speed (N1) according to rates in change of the engine speed.

10. The engine control system as defined in claim 8, and further comprising swirl generating means for generating a swirl of air when the stratified charge combustion mode is established.

11. The engine control system as defined in claim 9, and further comprising swirl generating means for generating a swirl of air when the stratified charge combustion mode is established.

12. The engine control system as defined in claim 1, wherein fuel is injected directly into an combustion chamber of the engine and said intake air regulation means is installed to an upstream part of the intake passage.

13. The engine control system as defined in claim 12, wherein said intake air control means includes a speed sensor for detecting a rotational speed of the engine and compares the engine speed with a first critical speed (N1) specified to be slightly higher than a second critical speed at which the fuel-cut control is terminated to predict that the fuel-cut control is shortly before termination when the engine speed is lower than said first critical speed (N2).

14. The engine control system as defined in claim 13, wherein said intake air control means changes said first critical speed (N2) according to rates in change of the engine speed.

15. The engine control system as defined in claim 13, and further comprising swirl generating means for generating a swirl of air when the stratified charge combustion mode is established.

16. The engine control system as defined in claim 14, and further comprising swirl generating means for generating a swirl of air when the stratified charge combustion mode is established.

17. An engine control system for an automobile engine of a type injecting fuel directly into an combustion chamber of the engine for executing a fuel-cut control under a specified engine operating condition and establishing a stratified charge combustion mode and a homogeneous charge combustion mode selectively according to engine operating conditions following termination of the fuel-cut control, said engine control system comprising:

an electrically controlled throttle valve disposed in an intake passage of an intake system of the engine to regulate a cross-sectional area of the intake passage;

an actuator to electrically actuate said throttle valve; and a controller to cause said actuator to shut off nearly completely said throttle valve during execution of the fuel-cut control and to open said throttle valve so as to variably control an amount of intake air passing through said intake passage into the combustion chamber before the stratified charge combustion mode is established following termination of the fuel-cut control.

* * * * *